United States Patent
Rice et al.

(10) Patent No.: US 7,097,422 B2
(45) Date of Patent: Aug. 29, 2006

(54) HOOP STRESS RELIEF MECHANISM FOR GAS TURBINE ENGINES

(75) Inventors: Derek A. Rice, Phoenix, AZ (US); David R. Waldman, Chandler, AZ (US); Redge How, Phoenix, AZ (US); Maher A. Serag, Phoenix, AZ (US); Paul D. Rippey, Waddell, AZ (US); Charles P. Silcox, Tempe, AZ (US); Henry L. Chester, Tempe, AZ (US); Ramasami (Rajan) Thiyagarajan, Mesa, AZ (US); Hsin-Yi Liu, Chandler, AZ (US); Paul E. Hruska, Gilbert, AZ (US); Richard E. Jackson, Phoenix, AZ (US); David A. Innes, Queen Creek, AZ (US); Gordon B. Bailey, Lyman, SC (US)

(73) Assignee: Honeywell International, Inc., Morristown, NJ (US)

( * ) Notice: Subject to any disclaimer, the term of this patent is extended or adjusted under 35 U.S.C. 154(b) by 135 days.

(21) Appl. No.: 10/771,689

(22) Filed: Feb. 3, 2004

(65) Prior Publication Data

US 2006/0099078 A1 May 11, 2006

(51) Int. Cl.
*F01D 25/26* (2006.01)
(52) U.S. Cl. .................... 415/134; 416/224 R
(58) Field of Classification Search ............ 416/234, 416/231 R, 244 R, 244 A, 248; 415/108, 415/134, 135
See application file for complete search history.

(56) References Cited

U.S. PATENT DOCUMENTS

| 3,781,125 | A |   | 12/1973 | Rahaim et al. |
|---|---|---|---|---|
| 4,536,932 | A |   | 8/1985 | Athey |
| 4,817,454 | A |   | 4/1989 | Schopf et al. |
| 5,071,313 | A |   | 12/1991 | Nichols |
| 5,151,325 | A | * | 9/1992 | Draskovich ............ 428/325 |
| 5,213,475 | A |   | 5/1993 | Peterson et al. |
| 5,292,385 | A |   | 3/1994 | Kington |
| 5,593,276 | A |   | 1/1997 | Proctor et al. |
| 5,850,895 | A | * | 12/1998 | Evrard ................. 188/264 A |
| 6,369,343 | B1 | * | 4/2002 | Krenz et al. ........... 219/69.11 |

* cited by examiner

*Primary Examiner*—Edward K. Look
*Assistant Examiner*—Dwayne J White
(74) *Attorney, Agent, or Firm*—Ingrassia Fisher & Lorenz

(57) ABSTRACT

A hoop stress relief mechanism is disclosed for use on a rotary body to relieve stress caused by both thermal and centrifugal forces. The mechanism may consist of a J-shaped slot cut from the outer rim of the rotary body a distance inwardly toward the axis of rotation, the slot having a curve in its inward end that curves back towards the outer rim. The J-shaped slot may extend through the rotary body to join its two faces. The J-shaped slot may be fabricated by an electric discharge wire machine. The electric discharge wire machine may make multiple passes in order to smooth the bottom surface of the curved slot portion.

28 Claims, 8 Drawing Sheets

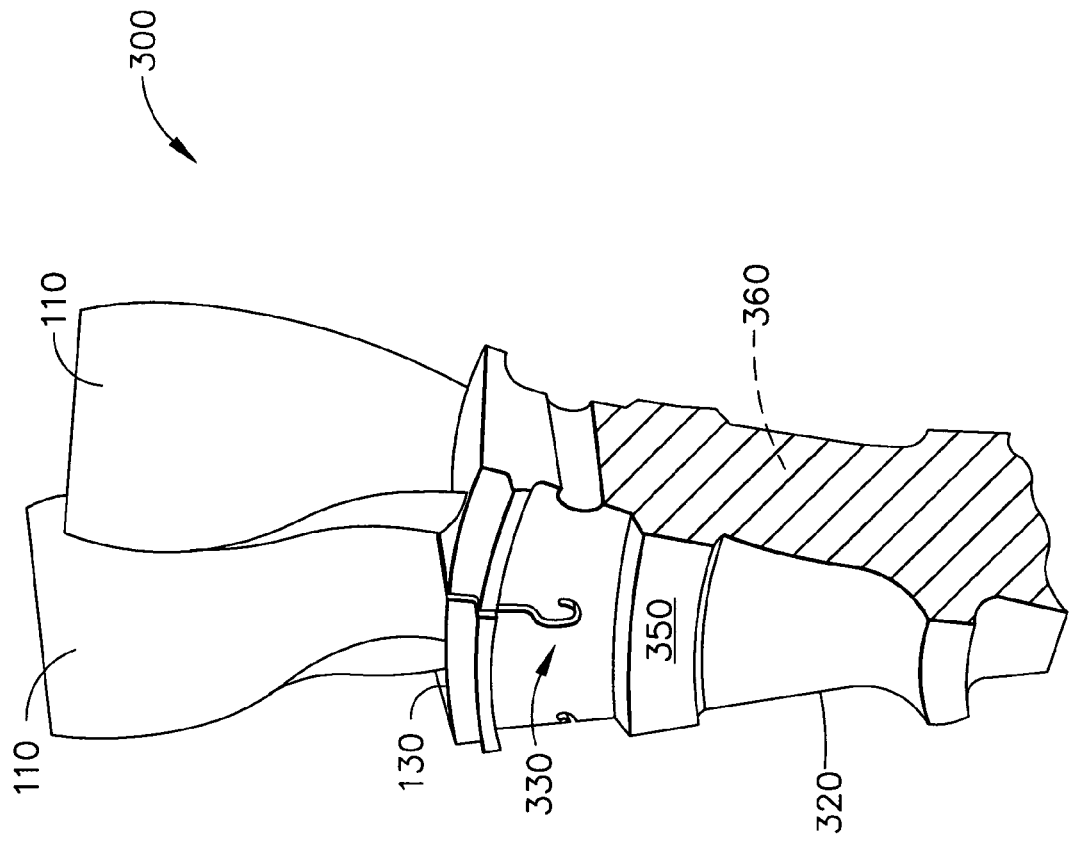
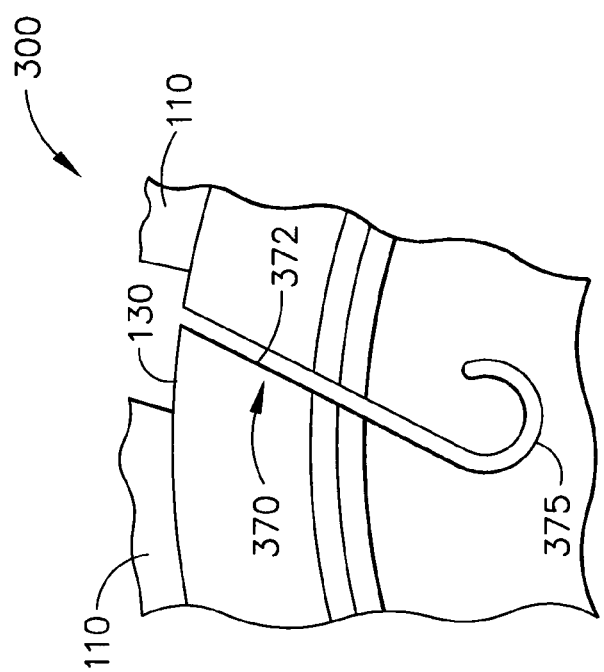
FIG. 3b
FIG. 3a

US 7,097,422 B2

HOOP STRESS RELIEF MECHANISM FOR GAS TURBINE ENGINES

BACKGROUND OF THE INVENTION

The present invention generally relates to articles of manufacture and methods of fabrication for mechanisms to relieve hoop stress in rotating bodies and, more specifically, to a J-slot modification to a rotating disk having integral cast blades such as those contained in a gas turbine engine.

Hoop stress is defined as a load measured in the direction of the circumference of a rotating body, the load being created by thermal gradients and centrifugal forces acting in a radial direction outwardly from the axis of rotation of the body. Such stress is particularly acute in the art of gas turbine engine design where the turbine disks may have integrally cast blades. Such turbine disks have been observed to develop fractures along the circumference of the disk during use.

A number of methods were devised to prevent such fractures. Initially a series of circumferential slots were fabricated into the outer edge of the disk and extending inwardly, the slots being produced using an electric discharge wire machine (EDM). The slots were observed to develop fractures at the inner end nearest the axis of rotation during use, so that a relief hole was drilled at the inner end of the slot to prevent further fracturing. The relief hole was observed to promote increased hot gas ingestion through the disk, so that a rivet or pin had to be inserted through the hole to block such gas ingestion.

This particular prior art hoop stress relief mechanism is shown in FIGS. 1 and 2. According to FIG. 1, a prior art hoop stress relief mechanism is shown as fabricated into a section of rotary body 100 with integral blades 110. A slot 120 may be cut into the rotary body 100 radially from an outer rim 130 to intersect with a hole 140. The slot 120 and hole 140 extend through the rotary body 100 so that the face 150 and the opposing face (not shown) of the rotary body 100 may be connected. A rivet 160 shown in phantom line may be inserted into the hole 140 and secured, so that hot gasses impacting face 150 may be prevented from flowing through the hole 140 to the opposing face of the rotary body 100. Fabrication of the prior art hoop stress relief mechanism as shown may comprise the steps of drilling hole 140 through face 150 of the rotary body 100, using an EDM to fabricate a continuous slot 120 from the outer rim 130 to the hole 140, and deburring and reaming the hole 140 so that any gouges in the walls of hole 140 may be prevented from serving as sites for fractures in the rotary body 100. Referring to FIG. 2, a plurality of prior art slots 120 and holes 140 are fabricated between blades 110 around the circumference of the rotary body 100 so that hoop stress may be reduced and evenly distributed about the entire circumference of the outer rim 130.

The method for fabricating this hoop stress relief mechanism involves a number of manufacturing steps. Referring to FIG. 1, the hole 140 must be first drilled through the rotary body 100 and then reamed to remove any objectionable grooves or defects in the hole walls that formed in the drilling process. Next, the slot 120 must be machined from the outer rim 130 of the rotary body 100 to intersect the hole 140. A rivet 160 must then be installed in the hole 140 to inhibit the flow of hot gasses through the hole 140 thus formed. These steps are used to fabricate the hole-and-slot configuration about the outer rim 130 of the rotary body 100, and then the rotary body 100 is spun and balanced. The rivets 160 must then be inspected after the spinning operation to ensure that they are still properly seated and not deformed by the centrifugal force generated by the spin operation.

However, there are a number of problems associated with this mechanism: First, the method of fabricating the hoop stress relief mechanism involves a detailed sequence of operations that must be precisely executed. This sequence consists of drilling a hole of exact proportions through the disk, reaming the hole to eliminate ridges and grooves within the walls of its bore, cutting an EDM slot from the rim of the disk to the hole, inserting a rivet through the hole to prevent hot gas ingestion from an adjacent space, and inspecting the rivet for correct installation and placement. This sequence is labor intensive, time consuming, and exacting, and thus expensive.

Second, the rivet inserted into the drilled hole is frequently dislodged by vibration, thermal shock, or mechanical means during use. The rivet thus released can cause downstream damage within the turbine. Also, hot gases may subsequently leak through the turbine disk and reduce engine efficiency.

A third problem is that rivets have varying tolerances, so that when installed, they present a balancing problem. As the turbine rotates more rapidly, rivets that are mismatched as to size, weight, or placement along the circumference of the disk start producing unacceptable vibration. Too much vibration can cause the entire turbine to fail.

A fourth problem is that there are variations between different tools used to fabricate the holes and slots, which must be accounted for. For example, in a test, 24 holes were drilled with a 0.120" drill, reamed with a 0.128" reamer, and finally finished by four 0.1315" reamers (6 holes each) to determine if tool variation was significant. An analysis of variance of the surface finish as a function of the block (final reamer) yielded a p-value <0.05, that is, the confidence is greater than 95% (p-value is a statement of probability where confidence=1−p-value). This test showed that the reamer/tool is significant and influences the surface finish. Mean surface finish for each tool ranged from 9.8Ra to 25.9Ra. Therefore, hole-drilling quality is limited by tool variation and is a problem in production fabrication. Current hole drilling processes impart detrimental flaws to the inner diameter surface of the rivet hole; these flaws can serve as sites at which fractures are initiated.

A number of similar methods have been found in the prior art to relieve hoop stress in various engine parts. U.S. Pat. No. 3,781,125 teaches the use of a keyhole shaped slotted portion in the outer shroud structure of a nozzle vane structure for a gas turbine engine. The keyhole shaped slot reduces stress due to larger temperature gradients. A threaded sealing member, instead of a rivet, is inserted into the keyhole to restrict gas flow. However, this application is made for a non-rotating shroud, and not for a turbine disk, and therefore does not experience the same problems as would be experienced by a rapidly rotating turbine disk.

U.S. Pat. No. 4,536,932 teaches a method of forming a turbine disk having integral blades from a plate shaped forging preform A plurality of slots is formed between the integral blades, and the slots are then closed by the forging process. A rod or wire may be inserted at the base of each slot to increase the radius at the end of the slot. However, this process is amenable only to forging processes and does not address machining issues regarding the slot bases.

U.S. Pat. No. 5,071,313 teaches the use of T-shaped relief slots of a shroud body of a gas turbine engine. The relief slots are made in the outer portion of a non-rotating shroud for relief from thermal stress and not for centrifugal stress, where balancing and uniformity of the slots is a concern. The teaching is made for a non-rotating shroud, and not for a turbine disk, and therefore does not experience the same problems as would be experienced by a rapidly rotating turbine disk. The teaching does not discuss any considerations in the fabrication of the slots.

As can be seen, there is a need for a mechanism for relieving hoop stress in a rapidly rotating turbine disk structure, where the mechanism is simple to fabricate, does not allow excessive passage of hot gasses through the turbine disk, does not employ rivets which may become dislodged through use, and does not depend upon uniformity of the machining tools used to fabricate the mechanism.

SUMMARY OF THE INVENTION

In one aspect of the present invention, a hoop stress relief mechanism is provided for a solid rotary body with two faces and an outer rim. The mechanism comprises a slot extending inwardly a distance from the outer rim and providing communication between the first face and the second face, the slot having a first end at the outer rim and a second end, the slot also having a curved slot portion adjoining the second end.

In another aspect of the invention, a turbine disk with a hoop stress relief mechanism is provided, where the hoop stress relief mechanism comprises a plurality of J-shaped slots fabricated into the rim of the turbine disk.

In another aspect of the invention, a rotary body with an axis of rotation about which the rotary body rotates is provided, where the rotary body comprises a disk portion with an outer rim and a circular first and second faces; and a slot with a linear slot portion extending inwardly a distance from the outer rim and providing communication between the first face and the second face, the slot having a first end at the outer rim and a second end. The slot also has a curved slot portion adjoining the second end of the linear slot portion, the curved slot portion with a top surface and a bottom surface, the bottom surface being closer than the top surface to the axis of rotation of the rotary body.

In another aspect of the invention, a method of fabricating a hoop stress relief mechanism in a rotary body with an outer rim, two faces, and an axis of rotation is provided, the method comprising cutting of a plurality of J-shaped slots around the rim of a rotary body, where each slot penetrates the rotary body from face to face.

In still another aspect of the invention, an electric discharge wire machine may be used to cut the J-slots into the rim of the rotary body.

In yet another aspect of the invention, a method is provided for fabricating a slot in a rotary body having an outer rim, two faces, and an axis of rotation, where the slot has a linear slot portion extending from a first point at the outer rim to a second point situated inwardly a distance towards the axis of rotation, the slot further having curved slot portion continuing from the second point and curving back towards the outer rim to terminate at a third end, the slot allowing communication between the two faces. The method comprises the steps of cutting the slot in the rotary body with wire of an electric wire discharge machine by making a first pass from the first point to the third point to form the slot; removing a first portion of a recast layer formed along a bottom surface of the curved slot portion by moving the wire inwardly towards the axis of rotation by a first offset and moving the wire in a second pass from the third point to the second point, the second pass being parallel with the path of the first pass; removing a second portion of the recast layer formed along the bottom surface by moving the wire inwardly towards the axis of rotation by a second offset and moving the wire in a third pass from the second point to the third point, the third pass being parallel with the path of the second pass; and removing a third portion of the recast layer formed along the bottom surface by moving the wire inwardly towards the axis of rotation by a third offset and moving the wire in a fourth pass from the third point to the second point, the fourth pass being parallel with the path of the third pass; so that the total portion of the recast layer along the bottom surface that is removed equals the sum of the first, second, and third offsets.

These and other features, aspects and advantages of the present invention will become better understood with reference to the following drawings, description, and claims.

BRIEF DESCRIPTION OF THE DRAWINGS

FIG. 3A shows a front view of a turbine disk illustrating a J-slot hoop stress relief mechanism, according to an embodiment of the invention;

FIG. 3B shows a side perspective view of a turbine disk illustrating the placement of the J-slot hoop stress relief mechanism with relationship to the blades of a turbine disk, according to an embodiment of the invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The invention provides an innovative mechanism for relieving fractures along the rim of a rotating body that may be caused by hoop stress forces. The innovative mechanism may be a slot extending inwardly from the rim in a generally radial direction and terminating in a curved portion. The slot may extend through the disk of the rotating body. Fabricating such a stress relieving slot in the circumferential rim of a disk may be inexpensive since it does not involve as many steps as the rivet mechanism described previously. There is minimal leakage through the disk and the slot may be essentially free from any hole drilling surface anomalies that may be caused by the drilling process.

Figure 1:
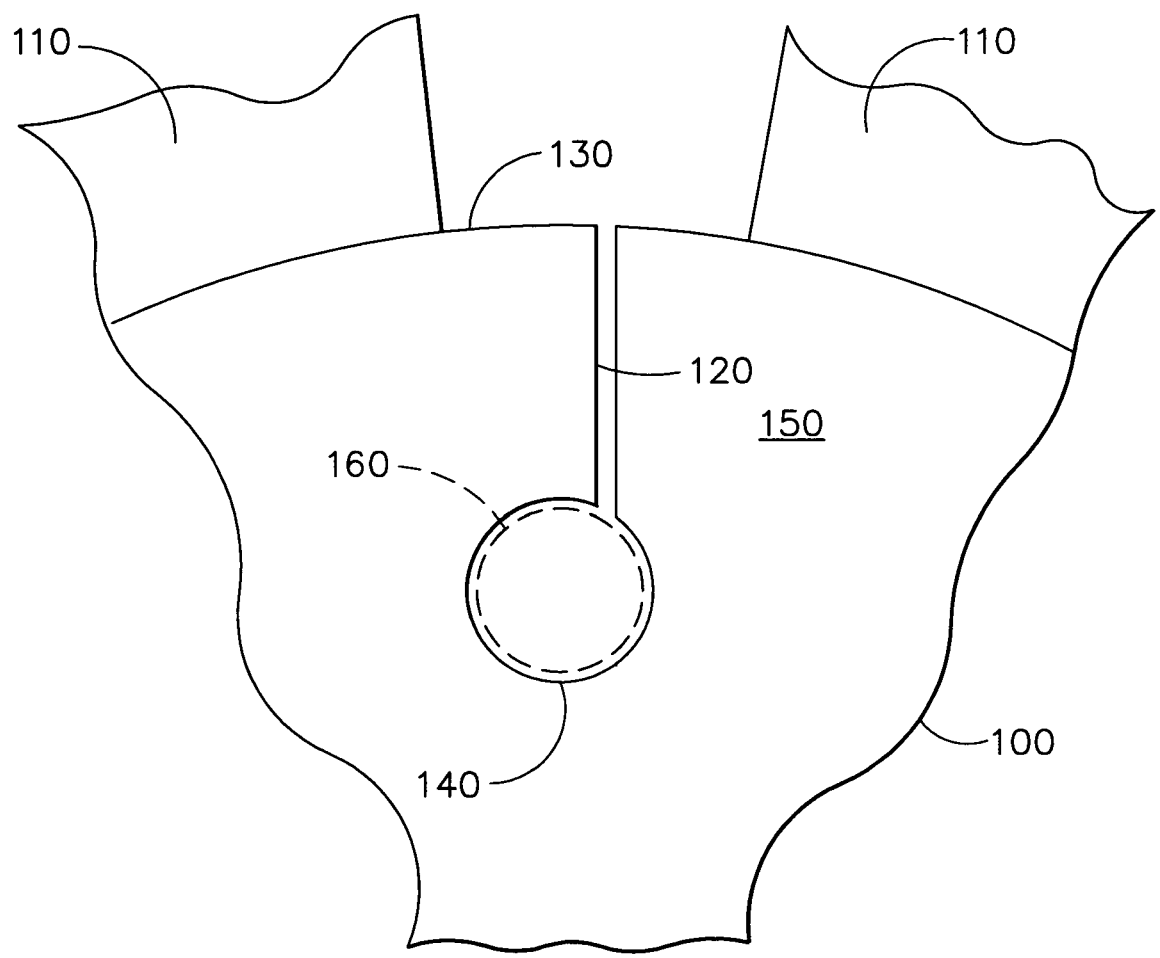
FIG. 1 shows a front view of a turbine disk illustrating a single, prior art hoop stress relief mechanism fabricated therein.
Figure 2:
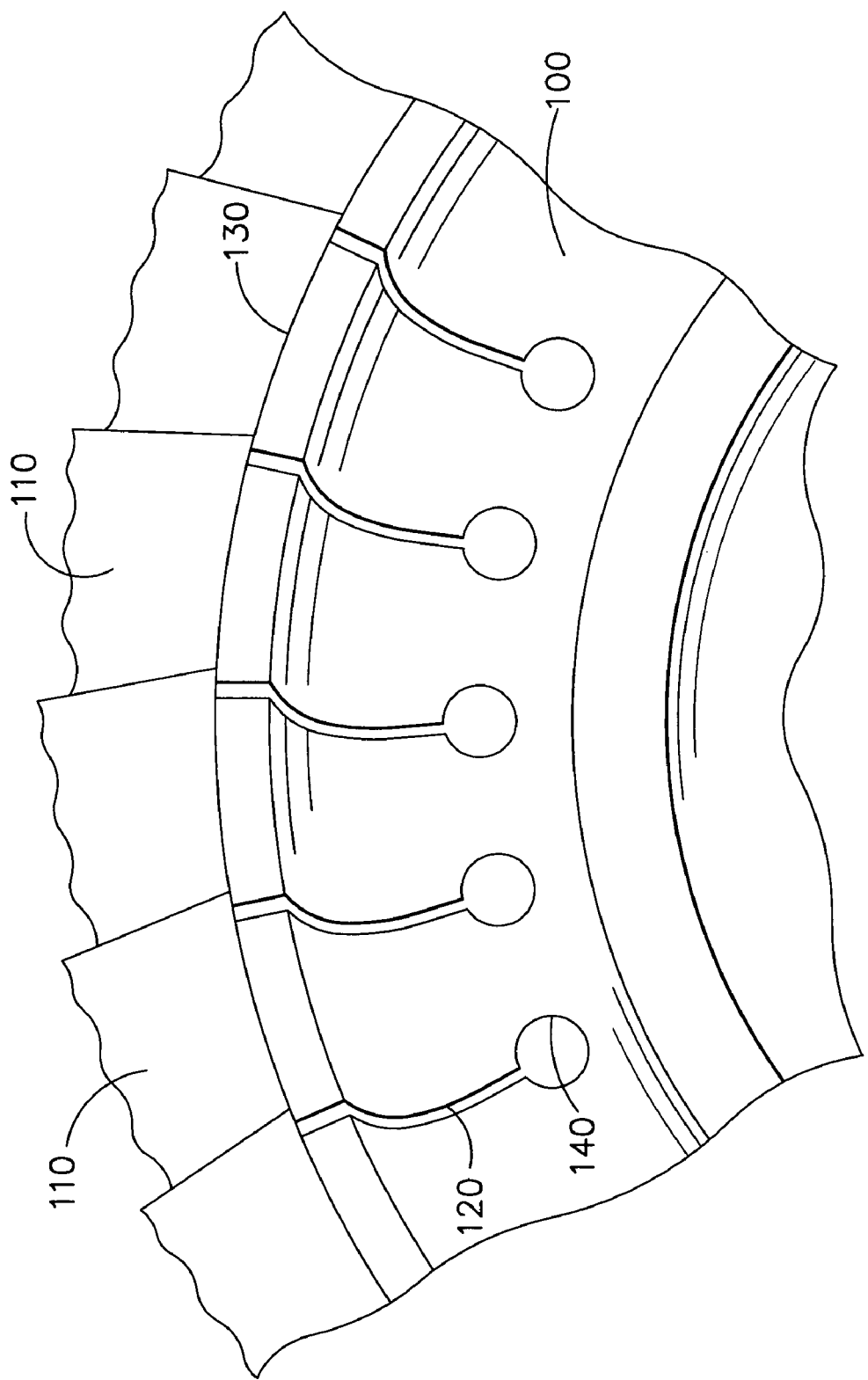
FIG. 2 shows a front view of a turbine disk with a plurality of prior art hoop stress relief mechanisms as they are fabricated along the rim of the turbine disk.
Figure 4:
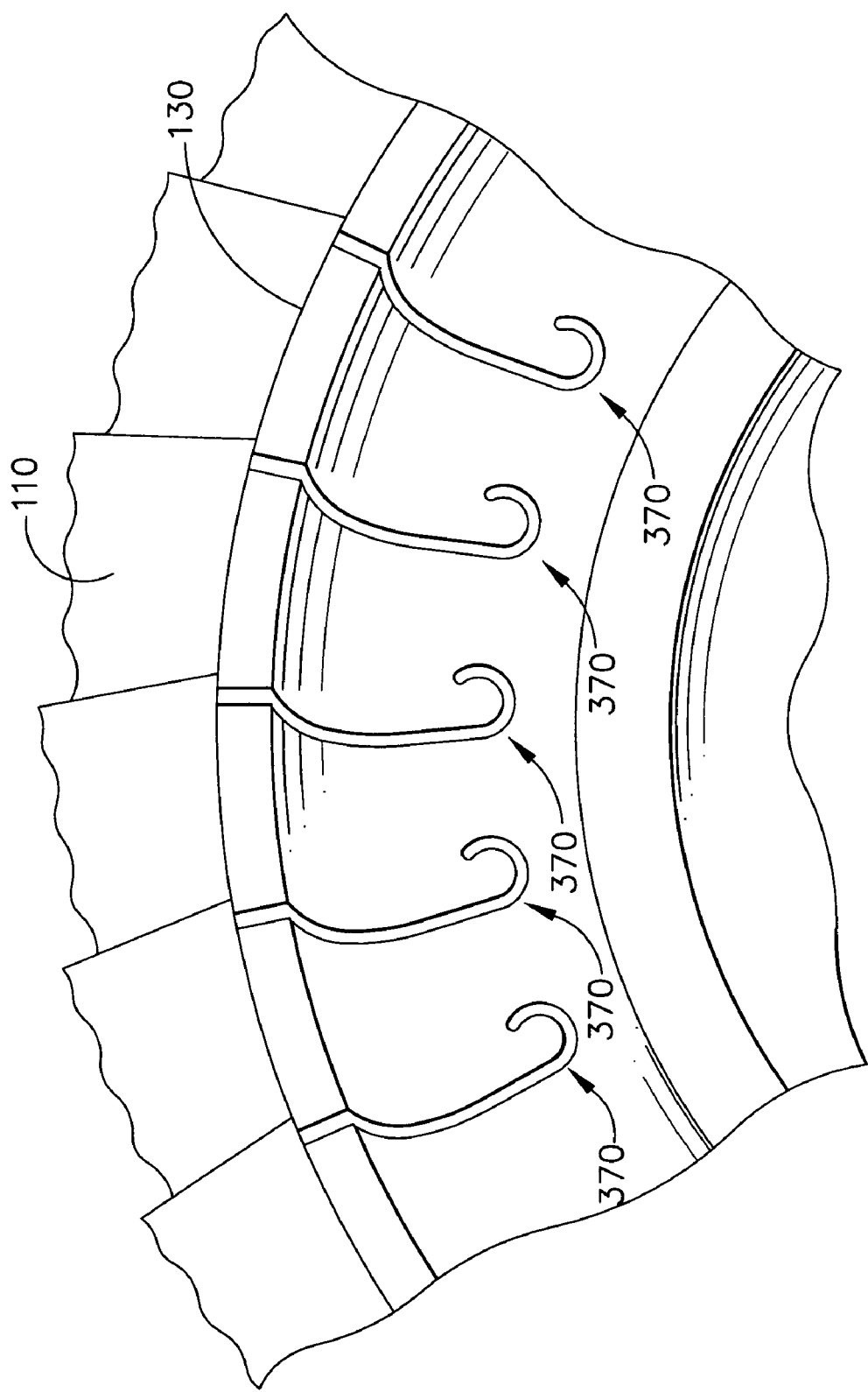
FIG. 4 shows a side perspective view of turbine disk with a plurality of hoop stress relief mechanisms as they are fabricated along the rim of the turbine disk, according to an embodiment of the invention.

Referring now to the drawings wherein like reference numerals are used throughout the various views to designate like parts and, more particularly, to FIGS. 3A and 3B, according to these figures, a segment 300 of a rotary body is shown, where the segment 300 has integral blades 110 cast with a disk portion 320. A hoop stress relief mechanism 330 is shown between the blades 110 of the segment 300 and passing through the disk portion 320 to exit on a front face 350 and a rear face 360 of the disk portion 320. Referring more particularly to FIG. 3A for detail, the relief mechanism 330 may be comprised of a J-slot 370 extending inwardly from a rim 130 of the segment 300. A linear slot portion 372 of the J-slot 370 may extend a distance before curving back upon itself in a curved slot portion 375 to form the J-slot 370. A plurality of J-slots 370 may be spaced along the circumference of a turbine disk as shown in FIG. 4 to provide stress relief for both thermal and centrifugal forces that would tend to cause fractures about the rim 130. The ends of the curved slot portions 375 may extend in either the direction of rotation of the rotary body 100 or the opposite direction.

Figure 5:
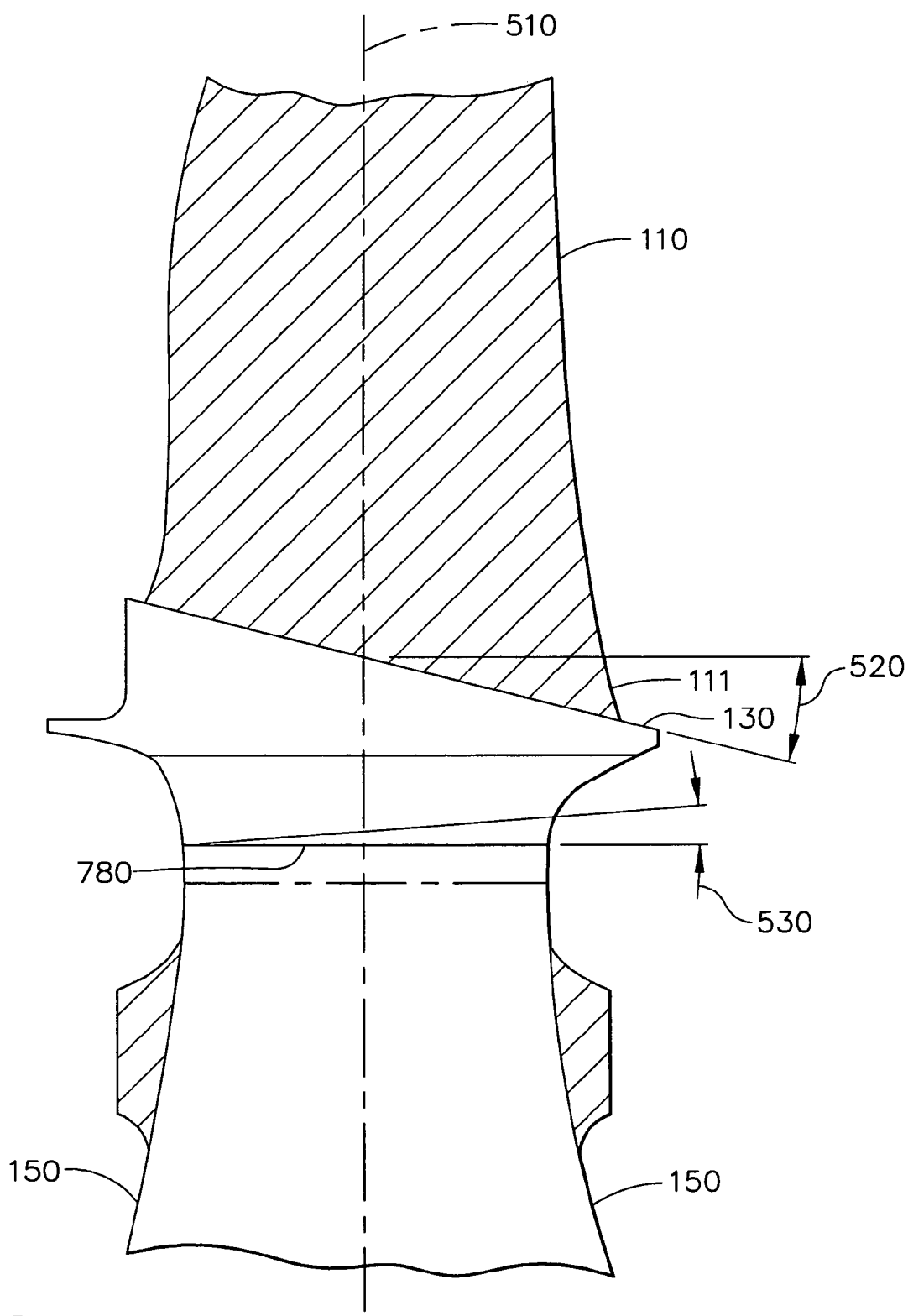
FIG. 5 shows a cross section of a rotary body with a tapered rim angle as defined by blade design, according to an embodiment of the invention.
Figure 6:
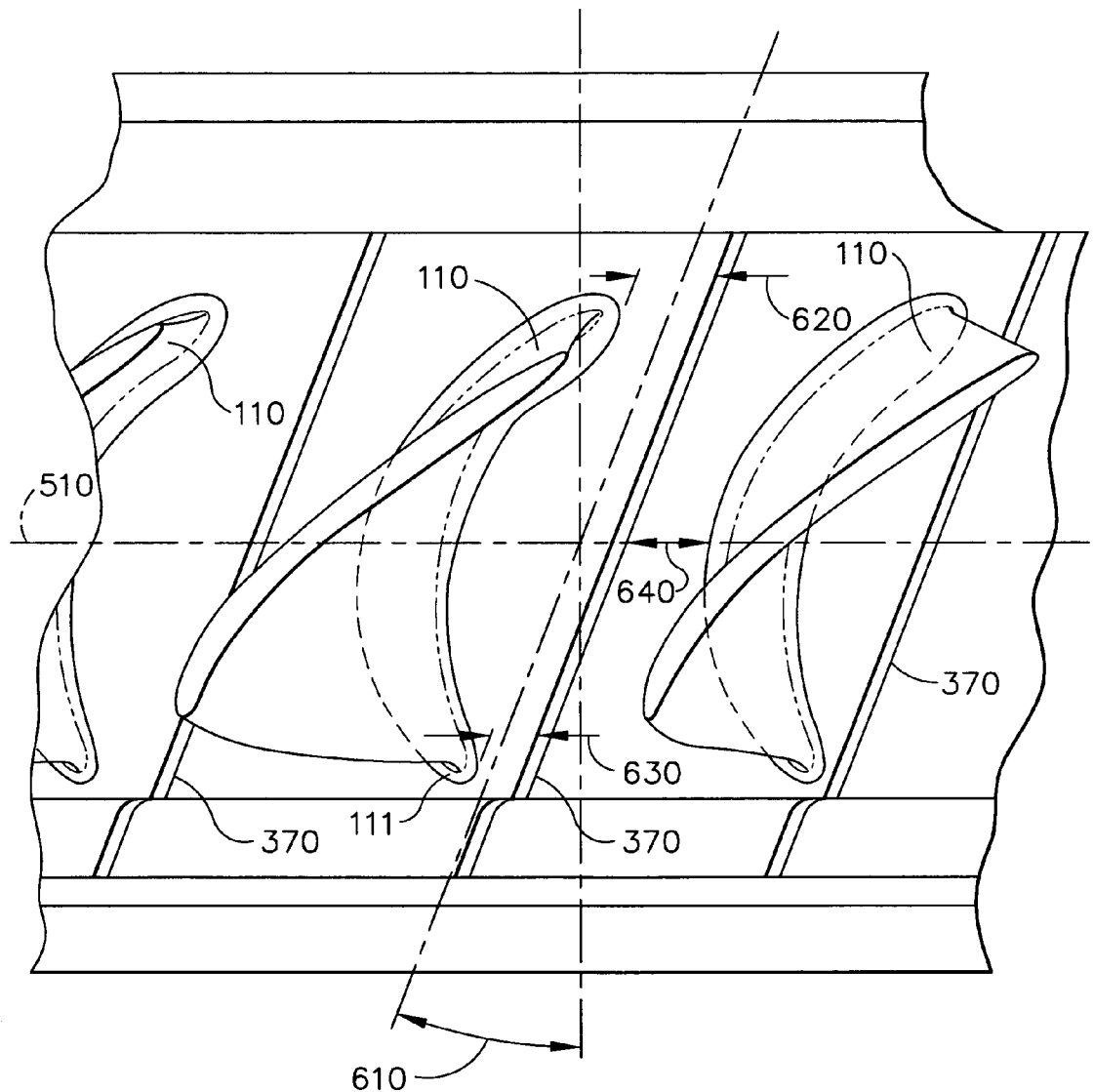
FIG. 6 shows a top perspective view of the rim of a rotary body, illustrating the placement of a J-slot between two adjacent blades, according to an embodiment of the invention.
Figure 7:
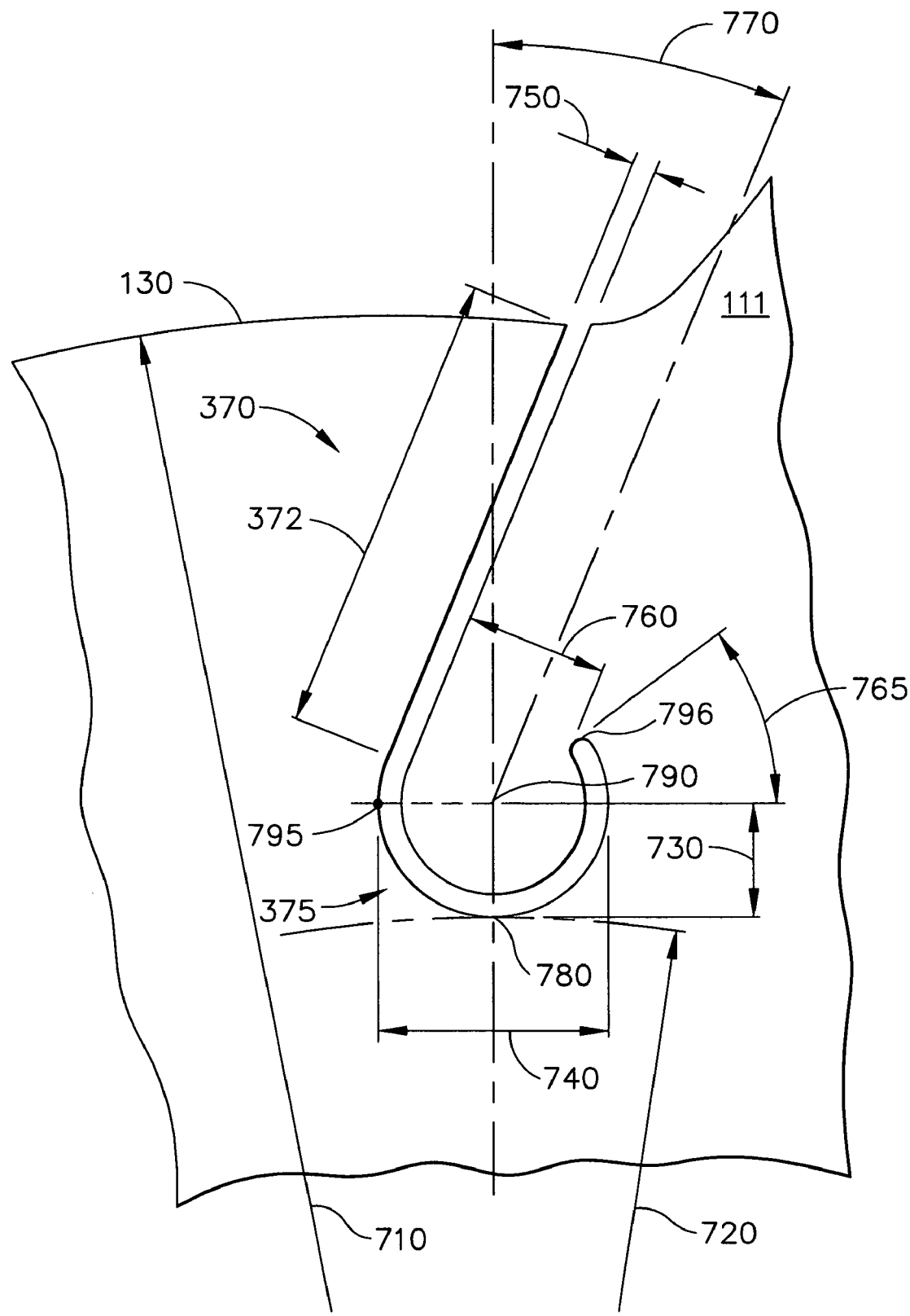
FIG. 7 shows the geometry of a representative J-slot with the orientation of the slot angle.

The geometry of a typical J-slot 370 and its relationship to a rotary body 100, such as a turbine disk, is shown in FIGS. 5, 6, and 7. According to FIGS. 5 and 6, the stacking axes 510 of the rotary body 100 may exist in a plane perpendicular to its center of rotation and between its faces 150, such that the rotary body 100 may be balanced along each side of the stacking plane 510. Blades 110 may be integrally cast with the rotary body 100 such that they may extend radially from the rim 130 and the center of rotation of rotary body 100. It should be noted that the rim 130 is not necessarily perpendicular to the stacking axis 510 but may taper towards one face 150 or the other by a disk rim taper angle 520. The J-slot curved surface 375 may also be tapered with angle 530 from one face 150 to the other face 150 of the rotary body 100. Each blade 110 may have a fillet 111 at its base where it flares to meet the rim 130 without an abrupt change in the contour between the blade 110 and the rim 130.

As shown in FIG. 6, a J-slot 370 may be fabricated between two adjacent blades 110. The J-slot 370 may be fabricated at a slash angle 610, which is defined as the angle of the J-slot 370 from a plane orthogonal to the plane of the stacking axes 510 drawn through the center of rotation of the rotary body 100. The J-slot 370 should be constrained to avoid cutting through the fillet 111 of an adjacent blade 110, which may weaken the blade structure. In order to position the J-slot 370 between two adjacent blades 110 without making contact with the fillet 111 of either blade 110, it may be necessary to fabricate the J-slot 370 with a non-zero slash angle 610. Ideally, the leading edge offset 630 and the trailing edge offset 620 from one blade 110 and the blade convex surface offset 640 from the other blade 110 should all be equal; but design and balancing considerations may require empirical adjustment of these values.

Referring to FIG. 7, the geometry of a typical J-slot 370 is shown. Disk rim radius 710 may be defined as the distance from the center of rotation of the rotary disk to the rim 130 taken along the stacking plane 510. The slot bottom radius 720 may be defined as the distance from the center of rotation of the rotary disk 100 to the bottom 780 of the J-slot 370 taken along the stacking plane 510. The minor diameter of the J-slot 370 may be defined as two times the radial distance 730 from the bottom 780 of the J-slot 370 to a point 795 which is the point of tangency between the curved slot portion 375 and a radial line extending outward from the center of rotation of the rotary disk 100. The major diameter 740 of the J-slot curved portion 370 is shown in FIG. 7. Point 790 may be defined as the intersection of the slot rim radius 710 drawn through the bottom 780 of the J-slot 370 and circumferential line drawn through point 795. The linear slot portion 372 may be inclined at a slot angle 770 with respect to the rim 130, defined as the angle between the linear slot portion 372 and the disk rim radius 710 drawn through point 790.

The gap 760 between the slot tip 796 and the linear slot portion 372 may advantageously be of a distance of 0.050 inch or greater to ensure product quality and producibility. The tip angle 765 may be defined by a first line drawn between point 790 and the slot tip 796 and a second line tangent to a circle having its center at the axis of rotation and drawn through point 790. A tip angle 765 in a range between 20° to 80° may provide acceptable stress relief without failure of the J-slot 370.

Figure 8:
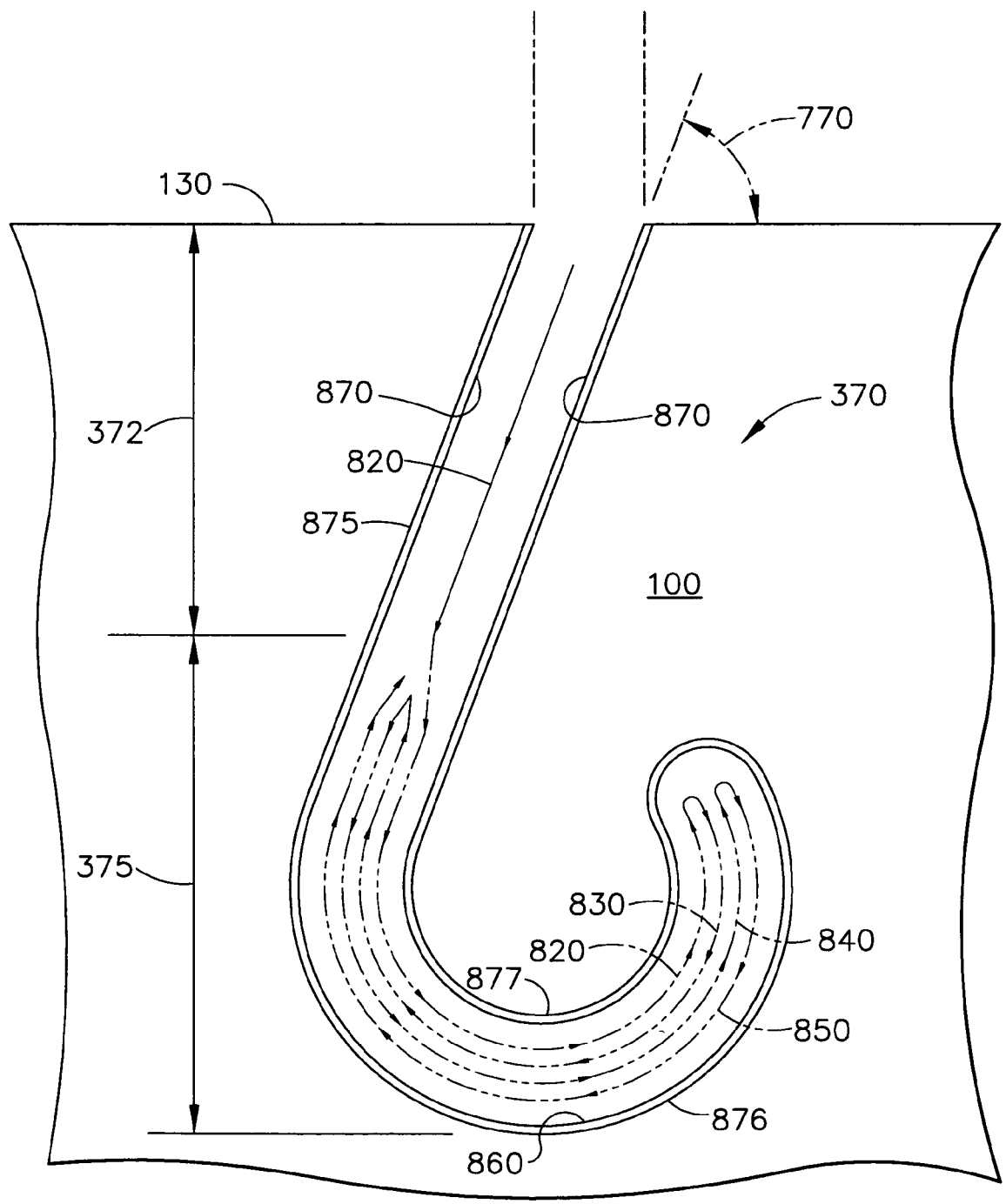
FIG. 8 shows a representative path taken by an EDM wire in fabricating the J-slot, according to an embodiment of the invention.

Using EDM technology, an inventive method for fabricating the J-slot 370 in the rim of a rotary body may use the EDM to remove material in the rotary body according to a predetermined pattern to form the J-slot 370. Referring to FIG. 8, it has been found that an EDM produces a recast layer 875, 876, 877 along the sides of a slot cut by the EDM. The recast layer 875, 876, 877 may be defined as the surface that results when an EDM has been used to cut away material. The EDM may generate sufficient heat in cutting away material that the surface along its path may have ridges, waves, and other irregularities. It has been found that in the art of turbine design, a rough surface may have a lower mean time before failure, because the hoop stress produced by rotation is concentrated by such irregularities; a smooth surface may thus have a longer service life. Therefore, it is desirable that the inner surfaces along a path made by an EDM have a smooth, uniform recast layer 875, 876, 877. The extent of the recast layer 875, 876, 877 may be influenced by the speed of the EDM cut, the angle at which the cut is made, and the amount of heat generated thereby. It has been further found that the surface 860 (FIG. 8) of the slot at the bottom of the curved slot portion 375 may be subjected to more hoop stress than the surface 870 along the linear slot portion 372 of the J-slot nearer the rim 130, and therefore it may be desirable for surface 860 at the bottom portion of the J-slot nearest the axis of rotation of the rotary body 100 to be fairly smooth, i.e. have a smooth or minimal recast layer 876. The recast layer 877 along top portion of the curved slot portion 375 may not be subjected to the same stress, and its thickness and uniformity may be immaterial.

The recast layer 876 along the bottom of the curved slot portion 375 may be smoothed by various methods that may be within the scope of the invention. However, a sequence of back-and-forth passes of the EDM as indicated in FIG. 8 may be advantageously provided by the inventive method to smooth the bottom of the curved slot portion 375. A first pass 820 may be made as a rough cut through the linear slot portion 372 and the curved slot portion 375, which may define the general shape of the J-slot. A second pass 830 may be made by reversing the direction of travel of the wire of the EDM as indicated and offsetting the path slightly in a direction normal to surface of the curved slot portion 372, with the second pass 830 generally following the path of the first pass 820 through the curved slot portion 375. The second pass 830 may be seen as removing a first portion of the recast layer 876 equal in thickness to the first offset of the path of the second pass 830. When the wire, while traveling along the path of the second pass 830, arrives at the junction of the linear slot portion 372 and the curved slot portion 375, the wire may again be reversed and offset towards the center of the rotary body 100 by a second amount to follow the indicated path of the third pass 840, thus removing a second portion of the recast layer 876 equal in thickness to the second offset of the path of the third pass 840. Finally, the wire may again be reversed and offset by a third amount to follow the indicated path of the fourth pass 850, thus removing a third portion of the recast layer 876 equal in thickness to the third offset of the path of the fourth pass 850. Thus, the recast layer 876 created by the first pass 820 may be smoothed along the surface 860 of the curved slot portion 375 nearest to the center of the rotary body 100 by removing an amount of material from the recast layer 876 equal to the sum of the first, second, and third offsets.

For example, it has been found through experimentation that a typical J-slot 370 may be fabricated according to the inventive method by making four passes on a Sodick machine using 0.008" diameter wire. The second, third, and fourth passes may be offset by amounts of 0.00051", 0.00063", and 0.00004", respectively. Other EDMs having different wire diameters and different offset values for the various passes could be used without departing from the scope of the invention. Current EDM technology can yield a recast thickness of less than 0.0002" and a 32Ra finish, resulting in an EDM wire J-slot 370 free from detrimental manufacturing flaws. This process may be repeated for selected locations around the perimeter of the rotary body to form a plurality of J-slots 370 around the rim of the rotary body as shown in FIG. 4. However, the number of slots may be equal to or less than the number of blades. Then the rotary body may be balanced to ensure that any manufacturing variations between different J-slots 370 are compensated for. The rotary body may also be spun up to speed to ensure a proper balance. It can be readily seen that use of the inventive method may eliminate three labor intensive manufacturing steps; where these steps are (1) hole drilling and reaming, (2) installation of rivets/pins, and (3) inspection of rivets after spinning (approx. 3.8 hrs/part). This in turn may eliminate the potential damage to the rotor surfaces during the installation and removal of rivets/pins. Furthermore, bin stock providing pins and/or rivets 160 used to reduce leakage through the holes 140 can be eliminated.

As shown in FIG. 8, the geometry of the J-slot 370 may be varied to maximize the stress relieving characteristics of the mechanism. Both the slash angle 610 and the slot angle 770 may be varied to keep hoop stress to which the J-slot 370 is subjected below a design threshold. These angles may be highly dependent upon the targeted service life for the rotary body 100, the blade geometry at the rim of the rotary body 100 and the number of blades 110, the material from which the rotary body 100 is manufactured, and the bending stress to which the rotary body 100 is subjected.

Also, other inventive configurations of the J-slot 370 may be conceived without departing from the scope of the invention. For example, a double J-slot 370 may be fabricated with two curved slot portions 375 each extending in opposite directions from the linear slot portion 372, in a shape much like an inverted "T" with the tips bent back towards the central shaft.

An inventive hoop stress relief mechanism and a method for its fabrication have thus been disclosed. The relief mechanism provided by the invention may be a series of J-shaped slots that have been machined about the rim of a rotary body, each slot penetrating the rotary body from face to face. The J-slots may be fabricated into the rim of the rotary body by a electric discharge wire machine, thus reducing the number of time consuming steps required by the prior art method of drilling and reaming holes and installing rivets therein.

It should be understood, of course, that the foregoing description of the invention relates to preferred embodiments of the invention and that modifications may be made without departing from the spirit and scope of the invention as set forth in the following claims.

We claim:

1. A hoop stress relief mechanism for a solid rotary body with two faces and an outer rim, the mechanism comprising
a J-shaped slot extending inwardly a distance from the outer rim and providing communication between the first face and the second face, the J-shaped slot having a linear slot portion with a first end at the outer rim and a second end, the J-shaped slot also having a curved slot portion with a third end adjoining the second end and terminating at a tip.

2. The hoop stress relief mechanism described in claim 1, wherein the linear slot portion is fabricated with a nonzero slot angle defined as the angle between a tangent at the outer rim and a centerline of the linear slot portion where it intersects the outer rim.

3. The hoop stress relief mechanism described in claim 1, wherein the slot has a non-perpendicular slash angle defined as the angle a surface of the linear slot portion makes with a face of the rotary body.

4. The hoop stress relief mechanism described in claim 1, wherein the rotary body is a turbine disk with a plurality of blades positioned around the outer rim.

5. The hoop stress relief mechanism described in claim 4, wherein the blades are integrally cast.

6. The hoop stress relief mechanism described in claim 1, wherein the rotary body has plurality of the slots about the outer rim.

7. The hoop stress relief mechanism described in claim 6, wherein each slot of the plurality of slots is positioned between two adjacent blades.

8. The hoop stress relief mechanism described in claim 6, wherein the curved slot portion of each slot of the plurality of slots is curved in the same direction.

9. The hoop stress relief mechanism described in claim 1, wherein the slot is formed by a wire of an electric discharge wire machine.

10. The hoop stress relief mechanism described in claim 1, wherein the distance between the tip and the linear slot portion is greater than 0.050".

11. The hoop stress relief mechanism described in claim 1, wherein the tip angle is in a range of 20° to 80°.

12. A rotary body with an axis of rotation about which the rotary body rotates, the rot body comprising
a J-shaped slot with a linear slot portion extending inwardly a distance from the outer rim and providing communication between the first face and the second face, the J-shaped slot having a first end at the outer rim and a second end, the J-shaped slot also having a curved slot portion adjoining the second end of the linear slot portion, the curved slot portion with a top surface and a bottom surface, the bottom surface being closer than the top surface to the axis of rotation of the rotary body.

13. The rotary body described in claim 12, wherein the J-shaped slot is formed by an electric discharge wire machine, which leaves a recast layer along all surfaces of the J-shaped slot, wherein the top surface and the bottom surface of the curved slot portion is are fabricated with a thinner recast layer than an inner surface of the linear slot portion.

14. The rotary body described in claim 12, where the bottom surface of the curved slot portion is formed from making two or more passes of the electric discharge wire machine along the bottom surface of the curved slot portion, each pass removing a portion of the recast layer along the bottom surface of the curved slot portion, whereby the bottom surface is made smoother than other surfaces of the J-shaped slot.

15. A gas turbine disk having integral blades and a hoop stress relief mechanism, the relief mechanism comprising
    a J-shaped slot with a linear portion and a curved portion, the linear portion extending inwardly a distance from an outer rim of the disk the linear portion having a first end at the outer rim and a second end, the slot also having a curved portion adjoining the second end of the linear portion, the linear portion and the curved portion jointly extending through the disk to provide communication between a first face of the disk and the second end of the disk, wherein the slot is fabricated by an electric discharge wire machine.

16. The gas turbine disk described in claim 15, wherein the slot is positioned between two blades.

17. A method of providing a hoop stress relief mechanism comprising a slot with a linear slot portion and a curved slot portion, the slot fabricated in a rotary body with an outer rim, two faces, and an axis of rotation, the method comprising
    continuously cutting the linear slot portion between the faces of the rotary body from the outer rim inwardly a distance to an inward end of the linear slot portion;
    cutting the curved slot portion between the faces of the rotary body by continuing from the inward end, the curved slot portion bending back towards the outer rim; and
    spin balancing the rotary body.

18. The method described in claim 17, wherein the steps of continuously cutting the linear slot portion and cutting the curved slot portion is accomplished by an electric discharge wire machine to remove material in the rotary body to form the linear slot portion and the curved slot portion thereby, the electric discharge wire machine leaving a recast layer along an inner surface of the linear slot portion and an inner surface of the curved slot portion.

19. The method described in claim 18, further comprising the step of removing a part of the recast layer along the inner surface of the curved slot portion that is nearest the axis of rotation.

20. The method described in claim 18, wherein the electric wire discharge machine makes at least a first pass and subsequent passes along the slot.

21. The method described in claim 20, wherein the first pass defines the slot, and subsequent passes remove a part of the recast layer along the inner surface of the curved slot portion that is nearest the axis of rotation.

22. The method described in claim 21, wherein the subsequent passes comprise three passes.

23. The method described in claim 22, wherein all passes are made using a 0.008" wire.

24. The method described in claim 23, wherein the three passes remove 0.00118" of the recast layer.

25. A method of fabricating a slot in a rotary body having an outer rim, two faces, and an axis of rotation, the slot having a linear slot portion extending from a first point at the outer rim to a second point situated inwardly a distance towards the axis of rotation, the slot further having curved slot portion continuing from the second point and curving back towards the outer rim to terminate at a third end, the slot allowing communication between the two faces, the method comprising
    cutting the slot in the rotary body with wire of an electric wire discharge machine by making a first pass from the first point to the third point, whereby the slot is formed; removing a first portion of a recast layer formed along a bottom surface of the curved slot portion by moving the wire inwardly towards the axis of rotation by a first offset and moving the wire in a second pass from the third point to the second point, the second pass being parallel with the path of the first pass;
    removing a second portion of the recast layer formed along the bottom surface by moving the wire inwardly towards the axis of rotation by a second offset and moving the wire in a third pass from the second pass; and
    removing a third portion of the recast layer formed along the bottom surface by moving the wire inwardly towards the axis of rotation by a third offset and moving the wire in a fourth pass from the third point to the second point the fourth pass being parallel with the path of the third pass; whereby the total portion of the recast layer along the bottom surface that is removed equals the sum of the first second and third offsets.

26. The method of fabricating a slot in a rotary body described in claim 25, wherein the wire has a diameter of 0.0008".

27. The method of fabricating a slot in a rotary body described in claim 26, wherein the total portion of the recast layer that is removed equals 0.00118".

28. The method of fabricating a slot in a rotary body described in claim 26, wherein the first offset is 0.00051", the second offset is 0.00063", and the third offset is 0.00004".

* * * * *

UNITED STATES PATENT AND TRADEMARK OFFICE
CERTIFICATE OF CORRECTION

PATENT NO. : 7,097,422 B2
APPLICATION NO. : 10/771689
DATED : August 29, 2006
INVENTOR(S) : A. Rice et al.

It is certified that error appears in the above-identified patent and that said Letters Patent is hereby corrected as shown below:

Title page, Item (75) Inventors name "Henry L. Chester" should be changed to --Chester L. Henry--;
Column 8, line 51, "rot" should be changed to --rotary--;
Column 8, line 66, "portion is are" should be changed to --portion are--.

Signed and Sealed this

Thirtieth Day of September, 2008

JON W. DUDAS
*Director of the United States Patent and Trademark Office*